(12) United States Patent
Yamaguchi et al.

(10) Patent No.: US 12,038,452 B2
(45) Date of Patent: Jul. 16, 2024

(54) SPECIMEN CARRIER

(71) Applicant: Hitachi High-Tech Corporation, Tokyo (JP)

(72) Inventors: Shigeki Yamaguchi, Tokyo (JP); Hiroshi Watanabe, Tokyo (JP); Kazuma Tamura, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 688 days.

(21) Appl. No.: 17/278,413

(22) PCT Filed: Feb. 14, 2020

(86) PCT No.: PCT/IB2020/051223
§ 371 (c)(1),
(2) Date: Mar. 22, 2021

(87) PCT Pub. No.: WO2020/148735
PCT Pub. Date: Jul. 23, 2020

(65) Prior Publication Data
US 2021/0356485 A1    Nov. 18, 2021

(30) Foreign Application Priority Data
Jan. 15, 2019    (JP) .................................. 2019-004059

(51) Int. Cl.
*B01L 3/00* (2006.01)
*B01L 9/00* (2006.01)
(Continued)

(52) U.S. Cl.
CPC .............. *G01N 35/04* (2013.01); *B01L 3/508* (2013.01); *B01L 9/00* (2013.01);
(Continued)

(58) Field of Classification Search
None
See application file for complete search history.

(56) References Cited

U.S. PATENT DOCUMENTS

| | | | | |
|---|---|---|---|---|
| 5,730,276 A | * | 3/1998 | Itoh ......................... | B01L 9/06 198/465.1 |
| 6,176,369 B1 | * | 1/2001 | Petrovic ............... | B65G 47/682 198/803.14 |

(Continued)

FOREIGN PATENT DOCUMENTS

| | | |
|---|---|---|
| JP | 57-161652 A | 10/1982 |
| JP | 2004-156923 A | 6/2004 |

(Continued)

OTHER PUBLICATIONS

Extended European Search Report received in corresponding European Application No. 20741679.3 dated Oct. 14, 2022.

(Continued)

*Primary Examiner* — P. Kathryn Wright
(74) *Attorney, Agent, or Firm* — MATTINGLY & MALUR, PC

(57) ABSTRACT

The present invention makes a directional control means for a specimen carrier unnecessary, reduces costs, and saves time. A high friction member 102 is provided on the bottom surface of a specimen carrier 100, thereby offsetting the center 14 of the frictional force 11 between the bottom surface and a conveyance surface, at a position separate from the rotational center of the bottom part of the specimen carrier 100. As a result, the friction between the conveyance surface and the bottom surface during conveyance of the specimen carrier 100 aligns the orientation of the specimen carrier 100 with respect to a conveyance direction 10, and makes it possible to make a carrier ID 101 and a specimen ID label 151 face towards a barcode reader.

3 Claims, 9 Drawing Sheets

(51) Int. Cl.
*G01N 35/00* (2006.01)
*G01N 35/04* (2006.01)

(52) U.S. Cl.
CPC .. *G01N 35/00732* (2013.01); *B01L 2300/021* (2013.01); *B01L 2300/0609* (2013.01); *B01L 2300/0832* (2013.01); *B01L 2300/161* (2013.01); *B01L 2300/168* (2013.01); *B65G 2201/0261* (2013.01); *G01N 2035/00752* (2013.01)

(56) References Cited

U.S. PATENT DOCUMENTS

| | | |
|---|---|---|
| 2004/0084531 A1 | 5/2004 | Itoh |
| 2014/0202829 A1 | 7/2014 | Eberhardt et al. |
| 2015/0034461 A1 | 2/2015 | Hecht |
| 2017/0108522 A1 | 4/2017 | Baer |
| 2018/0106820 A1 | 4/2018 | Okabe et al. |

FOREIGN PATENT DOCUMENTS

| | | |
|---|---|---|
| JP | 2014-513311 A | 5/2014 |
| JP | 2014-153276 A | 8/2014 |
| JP | 2015-508891 A | 3/2015 |
| JP | 2019-104598 A | 6/2019 |
| WO | 2012/158520 A1 | 11/2012 |
| WO | 2016/158122 A1 | 10/2016 |

OTHER PUBLICATIONS

International Search Report of PCT/IB2020/051223 dated May 12, 2020.

\* cited by examiner

[FIG. 1]
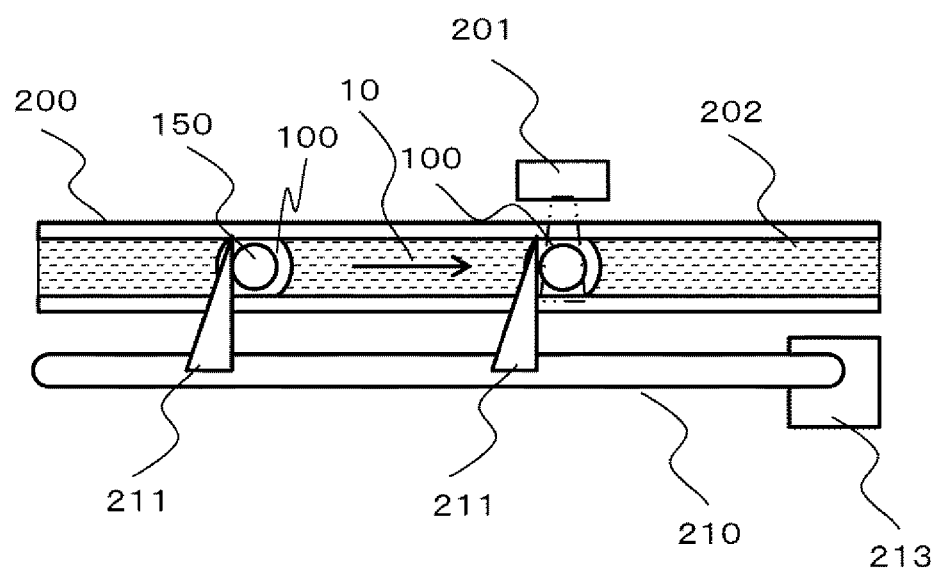

[FIG. 2]
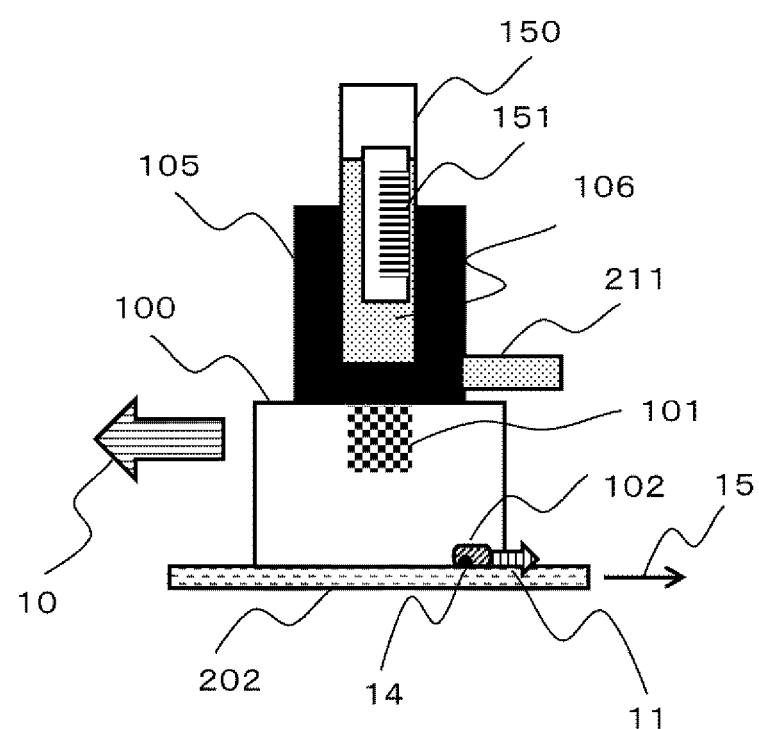

[FIG. 3]
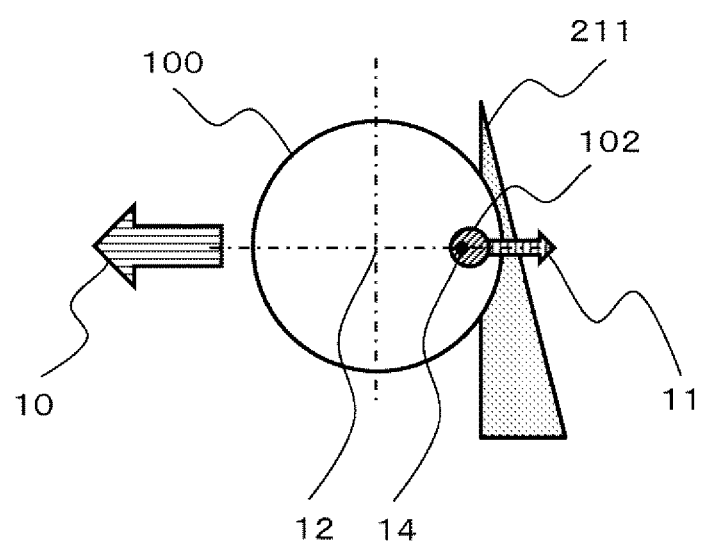

[FIG. 4]
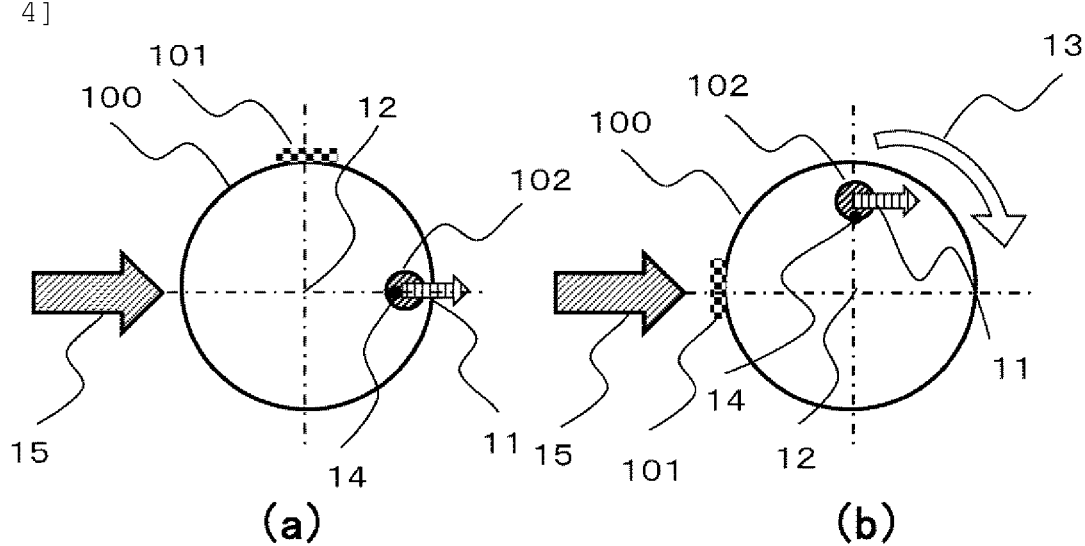
(a)　　　　　　　　(b)

[FIG. 5]
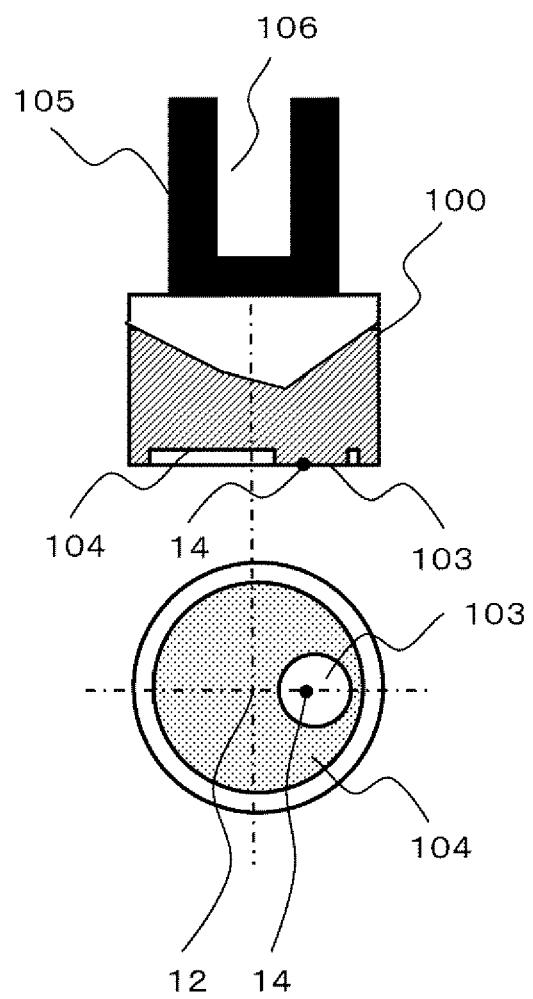

[FIG. 6]
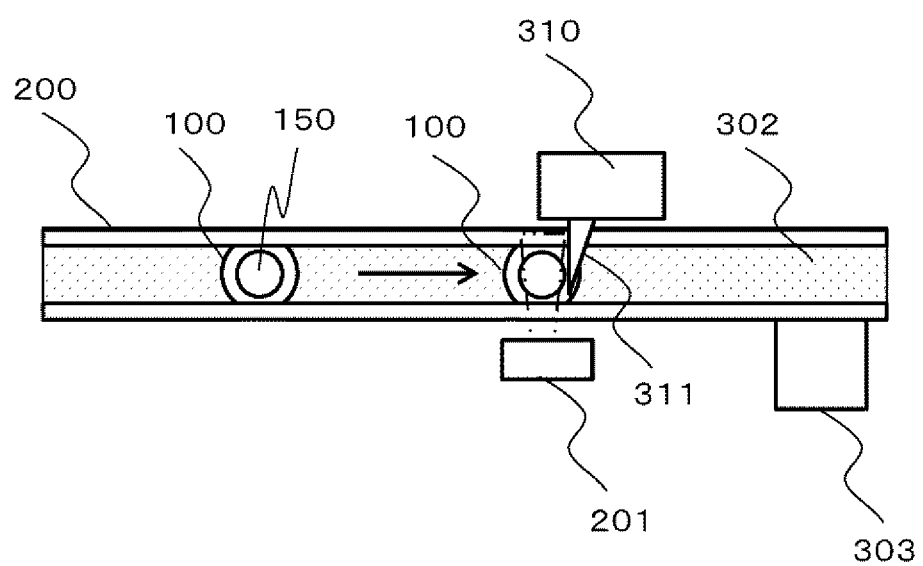

[FIG. 7]
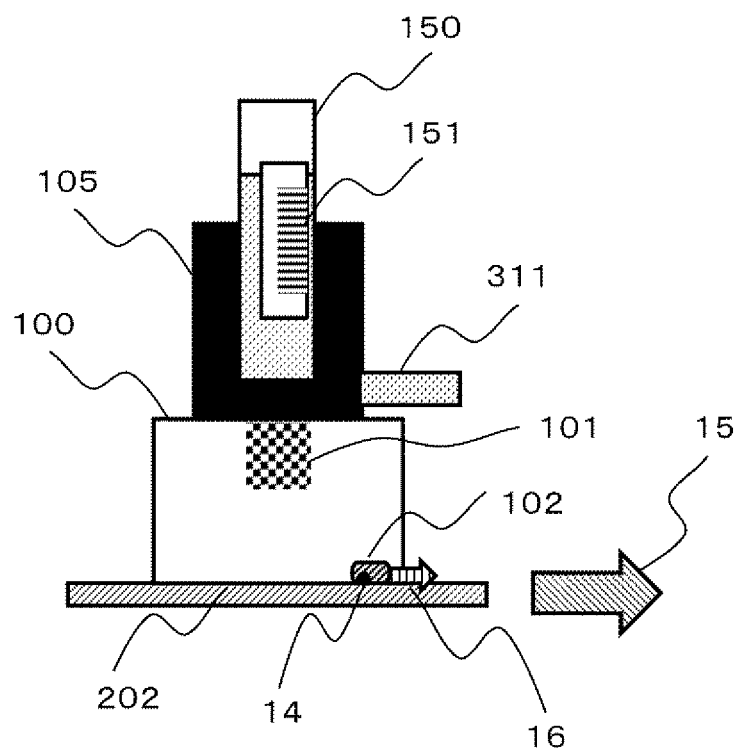

[FIG. 8]
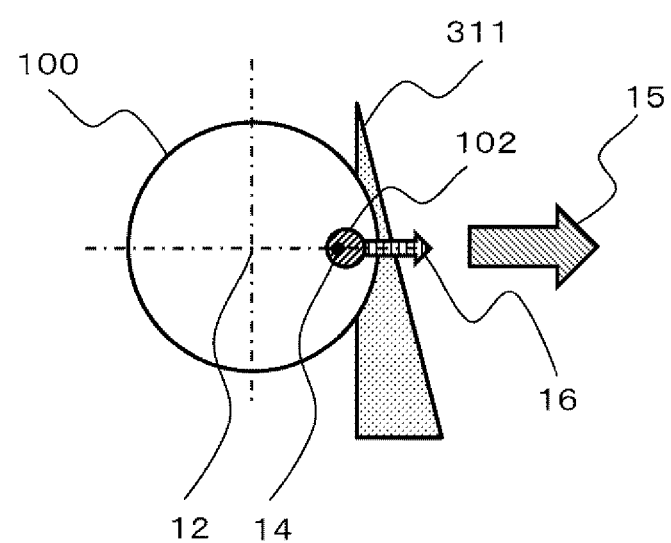

[FIG. 9]
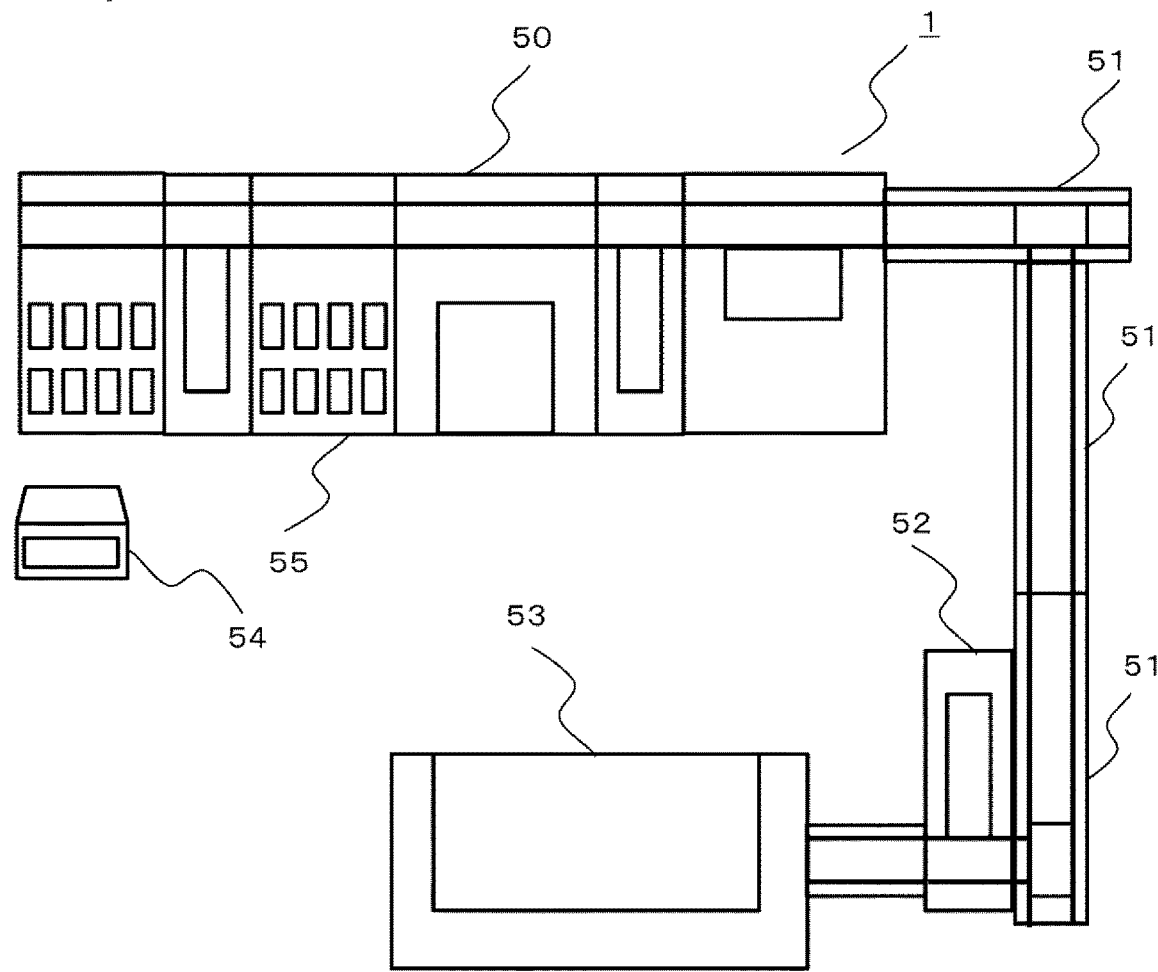

SPECIMEN CARRIER

TECHNICAL FIELD

The present invention relates to an automated specimen inspection system, and more particularly, to a specimen carrier which is a means for conveying a specimen container.

BACKGROUND ART

Recently, in specimen inspections for the purpose of diagnosis in the medical field, labor saving and expediting of the inspections using automated devices are in progress. In such an automated specimen inspection system, full automation of work relating to blood analysis process is in progress, by connecting a pretreatment device for blood specimens, an automatic analysis device, and a post-treatment device with a conveyance line.

The automated specimen inspection system generally employs a structure in which a specimen carrier, which is loaded with a specimen container and conveyed, is conveyed by a conveyance unit formed of a belt conveyor or the like. A barcode label describing a specimen identifier (ID information is affixed to the specimen container and used as information for connecting various processes for specimen to the specimen. In the automated specimen inspection system, in order to obtain information such as details of various pretreatments, branch destination of the conveyance unit, inspection items in the analysis device, and the like, the ID information is read by each processing unit or by a barcode reader installed immediately before the processing unit, information registered in the higher-level information system is inquired, and various processes are executed on the specimen based on the registered information.

A specimen carrier of the related art, and especially one that is intended to convey one specimen container often employs a cylindrical shape in order to have a structure such that the specimen container is conveyable likewise in any direction on a plane because of the degree of freedom in changing the advancing direction. In such a cylindrical specimen carrier, since the specimen carrier is rotated during conveyance, in order to read the specimen ID as a barcode or two-dimensional code attached to the specimen container or specimen carrier, the specimen ID needs to be oriented toward an ID reading means such as a barcode reader or the like.

Therefore, a means for rotating the specimen carrier and the specimen container is typically installed together with the ID reading means. In JP-A-2004-156923 (PTL 1), the ID information is read by rotating the specimen carrier by concentrating the frictional force by pressing the specimen carrier pressing roller stopped in front of the information reading device against the belt.

CITATION LIST

Patent Literature

PTL 1: JP-A-2004-156923

SUMMARY OF INVENTION

Technical Problem

As described above, when reading a barcode or a two-dimensional code attached to a cylindrical specimen carrier, the barcode or the like needs to face a reader, and a direction control means for the specimen carrier such as a rotation mechanism or the like is required. As a result, there is a problem that it takes time to drive the direction control means for controlling the orientation of the specimen carrier, the cost of the system is high, and the inspection time is long.

An object of the present invention is to provide a specimen carrier capable of solving the above problem, thereby reducing costs and shortening time.

Solution to Problem

In order to solve the above problems, the present invention relates to a specimen carrier holding a specimen container, and provides a specimen carrier in which a center of a bottom surface that is a contact surface with a conveyance surface that conveys the specimen container and a center of a frictional force between the conveyance surface and the bottom surface are offset.

Advantageous Effects of Invention

According to the present invention, it is possible to remove the direction control means, which makes it possible to reduce cost of system, and improve processing throughput.

BRIEF DESCRIPTION OF DRAWINGS

FIG. 1 is a plan view illustrating a configuration of a conveyance unit using a pawl feeding method according to a first embodiment.

FIG. 2 is a side view illustrating conveyance by the pawl feeding method according to the first embodiment.

FIG. 3 is a view illustrating conveyance by the pawl feeding method according to the first embodiment when seen from the bottom side of the carrier.

FIGS. 4(a) and 4(b) are views illustrating an operating principle according to the first embodiment when seen from the bottom side of the carrier.

FIG. 5 is a diagram of a modification example in which eccentricity of a frictional force of the bottom of the carrier is executed in the bottom shape according to the first embodiment.

FIG. 6 is a plan view illustrating a configuration of the conveyance unit according to a belt conveyance method according to a second embodiment.

FIG. 7 is a side view illustrating conveyance by the belt conveyance method according to the second embodiment.

FIG. 8 is a view illustrating conveyance by the belt conveyance method according to the second embodiment when seen from the bottom side of the carrier.

FIG. 9 is a diagram illustrating a configuration example of an automated specimen inspection system that employs the specimen carrier of each example.

DESCRIPTION OF EMBODIMENTS

Hereinafter, embodiments of the present invention will be sequentially described with reference to the drawings, but first, a configuration example of an automated specimen inspection system that employs a specimen carrier will be described. FIG. 9 is a diagram illustrating a configuration example of the automated specimen inspection system that employs the specimen carrier of each example. The automated specimen inspection system 1 includes a specimen pretreatment system 50, a specimen conveyance system 51, an automatic analysis device 53, a system operation unit 54 having a normal computer configuration, and the like.

In the automated specimen inspection system 1, a specimen to be inspected is handled in the state of being collected in a specimen container. The specimen container is inserted into the specimen carrier, which will be described in detail below, either manually by an operator or by an automatic insertion unit, and is conveyed into the automated specimen inspection system 1 by the specimen conveyance system 51 to be subjected to various processes.

The specimen pretreatment system 50 is a site where the specimen is pretreated before the analysis process. The specimen pretreatment system 50 provided with a specimen accommodation portion 55 is subjected to a specimen pretreatment step such as, receiving a specimen, a centrifugation process for a specimen that requires centrifugation, acquiring information such as an amount of liquid in the specimen or the like, an unplugging process of removing a plug of the specimen container, and a dispensing process for subdividing the specimen into a plurality of containers. The specimen conveyance system 51 is a conveyance line unit for conveying the carrier loaded with the specimen between the specimen pretreatment system 50 and the automatic analysis device 53.

An analysis device connecting unit 52 is placed between the specimen conveyance system 51 and the automatic analysis device 53. The specimens conveyed by the specimen conveyance system 51 toward the automatic analysis device 53 can be prevented from being congested by being carried into the analysis device through the analysis device connecting unit 52, such that the specimens waiting to be analyzed form a line on the specimen conveyance system 51. The specimen conveyance system 51 includes two conveyance line units, which are an advance route and a return route. The specimen completed with the pretreatment by the specimen pretreatment system 50 is conveyed to the automatic analysis device 53 by the conveyance line unit of the specimen conveyance system 51. The automatic analysis device 53 is a device that performs various analytical processes on the specimen. The specimen completed with the analysis process is conveyed to and stored in the specimen accommodation portion 55 provided in the pretreatment module 50 or the like by the conveyance line unit of the specimen conveyance system 51.

First Embodiment

The first embodiment is an embodiment of a specimen carrier that conveys a specimen by a pawl feeding conveyance method in the automated specimen inspection system described above, and is an embodiment of a specimen carrier having a configuration in which a center of a bottom surface that is a contact surface with a conveyance surface that conveys the specimen container and a center of a frictional force between the conveyance surface and the bottom surface are offset. The offset is a deviation between the center of the bottom surface and the center of the frictional force, and is a non-zero distance.

FIG. 1 is a plan view showing a configuration in which the specimen carrier according to the present embodiment is conveyed by a pawl feeding method. The conveyance unit shown in the present embodiment includes a conveyance guide rail 200, a pawl feeding mechanism 210, and a barcode reader 201. The specimen carrier 100 loaded with the specimen container 150 is conveyed by being pushed by the pawl feeding mechanism 210 along the conveyance guide rail 200.

Here, it is necessary to obtain information on the conveyance destination and the details of processing of each specimen in the automated specimen inspection system 1. Therefore, the specimen carrier is conveyed to a reading area of the barcode reader, the specimen ID is read, and an inquiry is made to a higher-level system. In the conveyance method of the related arts using the cylindrical specimen carrier, as described above, since it is difficult to convey the cylindrical specimen carrier with the specimen ID oriented in a certain direction, the method of rotating the carrier or the specimen in order to read the specimen ID at the reading position is employed. Meanwhile, a method of aligning the orientation of the specimen ID in the present embodiment will be described in detail below.

FIG. 2 is a side view illustrating a specimen carrier 100 and the conveyance unit according to the present embodiment. FIG. 3 is a view illustrating conveyance by the pawl feeding method according to the present embodiment when seen from the bottom side of the carrier. The specimen carrier 100 is conveyed while being slid on a conveyance surface 202 and pushed by a feeding pawl 211 in the direction of the arrow 10. Since the bottom surface of the specimen carrier 100 is a sliding surface with the conveyance surface 202, it is desirable to use a material that has a low coefficient of friction and can be pushed with a small force.

The bottom surface of the specimen carrier 100 according to the present embodiment is characterized in that a high friction member 102 is installed at a position deviated from a central axis 12 of the specimen carrier. That is, by providing the high friction member 102 having a larger frictional force than the other parts at a position deviated from the central axis of the specimen carrier 100, a center 14 of the frictional force acting on the bottom surface of the specimen carrier 100 can be located at a position distant from the central axis 12 of the specimen carrier 100.

In the present embodiment, the frictional force 11 generated by sliding due to conveyance is generated in the direction 180 degrees opposite to the advancing direction of the carrier indicated by the arrow 10. That is, when viewed with reference to the specimen carrier 100, the frictional force 11 acts in the same direction as a direction 15 in which the conveyance surface 202 is moved. The force for rotating the specimen carrier 100 with respect to the central axis 12 is changed according to the position of the frictional force 11, and by conveyance, the specimen carrier 100 can be aligned with a predetermined direction such as the position of the barcode reader, for example.

FIG. 4 is a diagram for explaining an operating principle of the direction alignment of the specimen carrier 100 by the frictional force 11 in the present embodiment when seen from the bottom side of the specimen carrier 100. FIG. 4A shows an example in which the rotational force due to the frictional force 11 does not act, and FIG. 4B shows an example in which the rotational force due to the frictional force 11 acts. As is clearly shown in the FIGS. 4A and 4B, the carrier ID 101 is provided on a side surface at a position substantially perpendicular to the center 14 of the frictional force.

In the present embodiment, as described above, since the frictional force 11 acts in the direction of the movement direction 15 of the conveyance surface 202 with respect to the specimen carrier 100, as shown in FIG. 4B, when the component of the frictional force 11 is present in the direction orthogonal to a straight line of the carrier central axis 12 and the center 14 of the frictional force, the rotational force 13 acts. The specimen carrier 100 is rotated by the rotational force 13, and the carrier ID 101 is rotated accordingly.

FIG. 4A shows an example of a state in which the directions are aligned by the frictional force 11. Since the straight line of the carrier center axis 12 and the center 14 of the frictional force 11 is in parallel with the direction of the frictional force 11, there is no frictional force component in the direction for the rotational force 13, and the rotational force does not act. Therefore, the specimen carrier 100 is aligned in a certain direction with respect to the conveyance direction. That is, by setting the description position of the ID 101 on the specimen carrier 100 at a position that can be read by the barcode reader 201 installed in a fixed positional relationship with respect to the conveyance guide rail 200, the display direction of the ID 101 can be aligned in a readable direction in accordance with the alignment of the specimen carrier 100.

When the specimen container 150 is installed in a holding unit 105 of the specimen carrier 100, it is installed at a position of a window 106 that is formed at a substantially perpendicular position to the ID 101 of the holding unit 105, and that allows the specimen ID label 151 attached to the specimen container 150 to be read, so that the specimen ID label 151 is oriented in the same direction as the ID 101 of the specimen carrier. As a result, the specimen ID label 151 of the specimen carrier 100 held by the holding unit 105 on the specimen carrier 100 can be aligned with respect to the conveyance direction. As described above, by installing the specimen ID label 151 toward the window 106 of the holding unit at a position substantially perpendicular to the carrier ID 101, the carrier ID 101 and the specimen ID label 151 can be read by the same reader.

As described above, since the orientations of the specimen carriers 100 are automatically aligned by the pawl feeding conveyance method of the present embodiment, when the specimen carrier 100 is conveyed in front of the barcode reader 201 without using the direction control means, the IDs are aligned with the barcode reader side, and reading can be performed immediately.

In the above description, although the ID reading means is described as the barcode reader, and the reading target is described as a one-dimensional barcode or a two-dimensional code, the present invention is not limited thereto. As another example, a method of reading characters by using an imaging means such as a camera or the like, a method of reading a label equipped with RFID, or the like may be used.

With the conveyance unit using the specimen carrier of present embodiment, the ID can be read by a simple mechanism. Since it is not necessary to rotate the specimen carrier by using the direction control means when reading the ID, it is possible to improve the processing throughput.

In the present embodiment described above, the high friction member is used to shift the center of the specimen carrier and the center of the frictional force, but the method of shifting the center of the frictional force is not limited thereto. For example, the center of the frictional force can be shifted by the shape of the bottom surface of the specimen carrier.

FIG. 5 is a view illustrating a modification example in which the center of the frictional force is shifted by forming irregularities on the bottom surface of the carrier. That is, apart that does not contact the bottom surface of the specimen carrier 100 is engraved so that the center of the frictional force deviates from the center of rotation of the specimen carrier. As shown in FIG. 5, a convex portion on the bottom surface of the specimen carrier 100 is the conveyance surface contact part 103 on the bottom surface of the carrier, and generates frictional force by sliding with the conveyance surface. A recess on the bottom surface of the carrier is a conveyance surface non-contact part 104 on the bottom surface of the carrier, and since the carrier does not slide with the conveyance surface, no frictional force is generated. In the present modification example, the conveyance surface contact part and the conveyance surface non-contact part on the bottom surface, that is, the irregularities formed on the bottom surface form a non-rotationally symmetric shape.

As shown in FIG. 5, by making the shape of the conveyance surface contact part 103 on the bottom surface of the carrier non-rotationally symmetric with respect to the carrier central axis 12, the center 14 of the frictional force can also be shifted to a position distant from the central axis 12 of the specimen carrier 100. As described above, by making the shape of the contact surface non-rotationally symmetric with respect to the center of the bottom surface, the center of the frictional force is offset, so that the orientation of the carriers can be automatically aligned by sliding as in the case of using the high friction member 102 shown in FIG. 2.

As described above, in the specimen carrier of the present embodiment, the orientation of the specimen carriers can be aligned by conveyance by arranging the center of the frictional force at a position distant from the axis of rotation of the bottom thereof, and the carrier ID can be oriented in a certain direction without using the direction control means.

Second Embodiment

Next, as a second embodiment, an embodiment of a conveyance unit having a configuration in which the specimen is conveyed by a belt conveyance method in the automated specimen inspection system described above will be described.

FIG. 6 is a plan view illustrating a configuration of the conveyance unit according to the belt conveyance method according to the present embodiment. The conveyance unit shown in the present embodiment includes the conveyance guide rail 200, a conveyance belt 302, a conveyance belt drive motor 303, a carrier stopper 310, and a barcode reader 201. The specimen carrier 100 loaded with the specimen container 150 is placed on the conveyance belt 302 driven by the conveyance belt drive motor 303 along the conveyance guide rail 200, and is conveyed in the conveyance unit. For the specimen carrier to be used, the specimen carrier same as the one described in the first embodiment can be used.

FIG. 7 is a side view illustrating the specimen carrier 100 and the conveyance unit according to the present embodiment. FIG. 8 is a view illustrating conveyance by the belt conveyance method according to the present embodiment when seen from the bottom side of the specimen carrier. The specimen carrier 100 is conveyed to the ID reading position in front of the barcode reader 201. The carrier stopper 310 for stopping the carrier 100 is installed at the ID reading position. The carrier stopper 310 is provided with a stopper arm 311 that can be taken in and out to block and stop the carrier 100, and stopping and conveyance of the specimen carrier 100 can be controlled at the ID reading position by taking the stopper arm 311 in and out. The specimen carrier 100 conveyed to the ID reading position may be stopped at the ID reading position by the stopper arm 311. Here, by keeping the conveyance belt 302 driven, the bottom surface of the carrier is slid on the surface of the conveyance belt and stopped at the ID reading position. Since the bottom surface of the specimen carrier 100 is a sliding surface with the conveyance surface, it is desirable to use a material that has a low coefficient of friction and can be pushed with a small force.

In the present embodiment, a frictional force 16 generated by sliding of the bottom surface of the specimen carrier 100 with the surface of the belt, that is, with the conveyance surface 202 that is the contact surface with the bottom surface of the carrier is generated in the same direction as the arrow 10 indicating the advancing direction of the specimen carrier. That is, when viewed with reference to the specimen carrier 100, the frictional force 16 acts in the direction 15 in which the conveyance surface 202 is moved. Therefore, by stopping the specimen carrier 100 with the carrier stopper 311, the orientation of the specimen carrier 100 can be aligned by the same principle as the description of FIG. 4 described in the first embodiment.

As described above, according to the present embodiment, since the orientation of the specimen carriers is automatically aligned by stopping the specimen carrier 100 with the carrier stopper 311, when the carrier stopper 311 is installed in front of the barcode reader 201, the ID can be read by a simple mechanism.

In the present embodiment, although it is described that the sliding with the conveyance surface is used for aligning the direction of the specimen carrier 100, the present invention is not limited thereto. A mechanism for locally causing sliding may be installed at the contact part with the bottom surface of the carrier at the ID reading position to align the directions of the specimen carriers.

According to the present invention described in detail above, it is possible to provide an automated specimen inspection system capable of aligning the specimen carriers without using a mechanism for rotating the direction of the specimen carriers, that is, without using the direction control means for the specimen carriers, and thus capable of simple and reliable ID reading.

The present disclosure is not limited to the embodiments described above, and includes various modification examples. For example, although the embodiments described above have been described in detail for a better understanding of the present invention, they are not necessarily limited to those including all the configurations described above.

REFERENCE SIGNS LIST

1: Automated specimen inspection system
10: Specimen carrier advancing direction
11 and 16: Arrow indicating frictional force
12: Central axis of specimen carrier
13: Arrow indicating rotational force
14: Center of frictional force
15: Moving direction of conveyance surface
50: Specimen pretreatment system
51: Specimen conveyance system
52: Analysis device connecting unit
53: Automatic analysis device
54: System operation section
100: Specimen carrier
101: Carrier ID
102: High friction member
103: Conveyance surface contact part
104: Conveyance surface non-contact part
105: Holding unit
106: Window of holding unit
150: Specimen container
151: Specimen ID label
200: Conveyance guide rail
201: Barcode reader
202: Conveyance surface
210: Pawl feeding mechanism
211: Feeding pawl
212: Feeding pawl driving motor
302: Conveyance belt
303: Conveyance belt driving motor
310: Carrier stopper
311: Carrier stopper arm

The invention claimed is:

1. A specimen carrier, comprising:
a cylindrical base having a bottom surface;
a specimen holder disposed on the cylindrical base configured to hold a specimen container having an identification (ID) label disposed thereon;
a high friction member disposed on the bottom surface of the cylindrical base offset from a central axis of the cylindrical base; and
a window disposed on the specimen holder through which the ID label of the specimen container is visible,
wherein the high friction member is immobile with respect to the bottom surface of the cylindrical base, and
wherein the high friction member is disposed 90 degrees from the window with respect to the central axis.

2. The specimen carrier according to claim 1,
wherein a carrier ID is disposed on a side surface of the cylindrical base below the window.

3. A specimen carrier, comprising:
a cylindrical base having a bottom surface;
a specimen holder disposed on the cylindrical base configured to hold a specimen container having an identification (ID) label disposed thereon; and
a window disposed on the specimen holder through which the ID label of the specimen container is visible,
wherein the bottom surface has convex surface offset from a central axis of the cylindrical base, which is a contact surface configured to contact a conveyance line, and a recessed portion that is coaxial with respect to the central axis, and
wherein the convex surface is immobile with respect to the bottom surface.

* * * * *